(12) United States Patent
Enomoto et al.

(10) Patent No.: US 6,412,581 B2
(45) Date of Patent: *Jul. 2, 2002

(54) RADIATOR MOUNTING STRUCTURE

(75) Inventors: Koji Enomoto; Suguru Yoshida, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/725,445

(22) Filed: Nov. 30, 2000

(30) Foreign Application Priority Data

Nov. 30, 1999 (JP) .......................................... 11-339297

(51) Int. Cl.$^7$ .............................................. B60K 11/04
(52) U.S. Cl. ......................................... 180/68.4; 165/69
(58) Field of Search ................................ 180/68.4, 300, 180/68.6, 312, 311; 165/67, 69, 149; 248/213.3, 213.4

(56) References Cited

U.S. PATENT DOCUMENTS

| 4,566,407 A | * | 1/1986 | Peter ........................ 123/41.48 |
| 4,579,184 A | * | 4/1986 | Hiramoto .................... 180/68.4 |
| 4,651,839 A | * | 3/1987 | Isobe ......................... 180/68.4 |
| 4,753,468 A | * | 6/1988 | Szymczak et al. .......... 293/132 |
| 4,763,723 A | * | 8/1988 | Granetzke .................... 165/67 |
| 4,770,234 A | * | 9/1988 | Hiraoka et al. ............... 165/69 |
| 5,219,016 A | * | 6/1993 | Bolton et al. ................. 165/41 |
| 5,269,367 A | * | 12/1993 | Susa et al. ..................... 165/41 |
| 5,544,714 A | * | 8/1996 | May et al. ..................... 180/68.4 |
| 5,573,299 A | * | 11/1996 | Masuda ....................... 296/194 |
| 5,881,685 A | * | 3/1999 | Foss et al. .................. 123/41.49 |
| 6,260,609 B1 | * | 7/2001 | Takahashi ................... 165/69 |

FOREIGN PATENT DOCUMENTS

JP 60-46335 4/1985
JP 60-47826 4/1985

* cited by examiner

Primary Examiner—Brian L. Johnson
Assistant Examiner—Bridget Avery
(74) Attorney, Agent, or Firm—Arent Fox Kintner Plotkin & Kahn, PLLC

(57) ABSTRACT

A radiator mounting structure which has a front grill located in front of a radiator and provided with a projection extending toward the radiator. When a hood collides with an obstacle M and is deformed, the deformation causes the front grill to move rearward whereby the radiator is urged rearward of a vehicle body to tilt in the same direction. Thus, the hood is sufficiently deformable to thereby sufficiently alleviate an impact shock to be applied to the obstacle within a limited space.

2 Claims, 7 Drawing Sheets

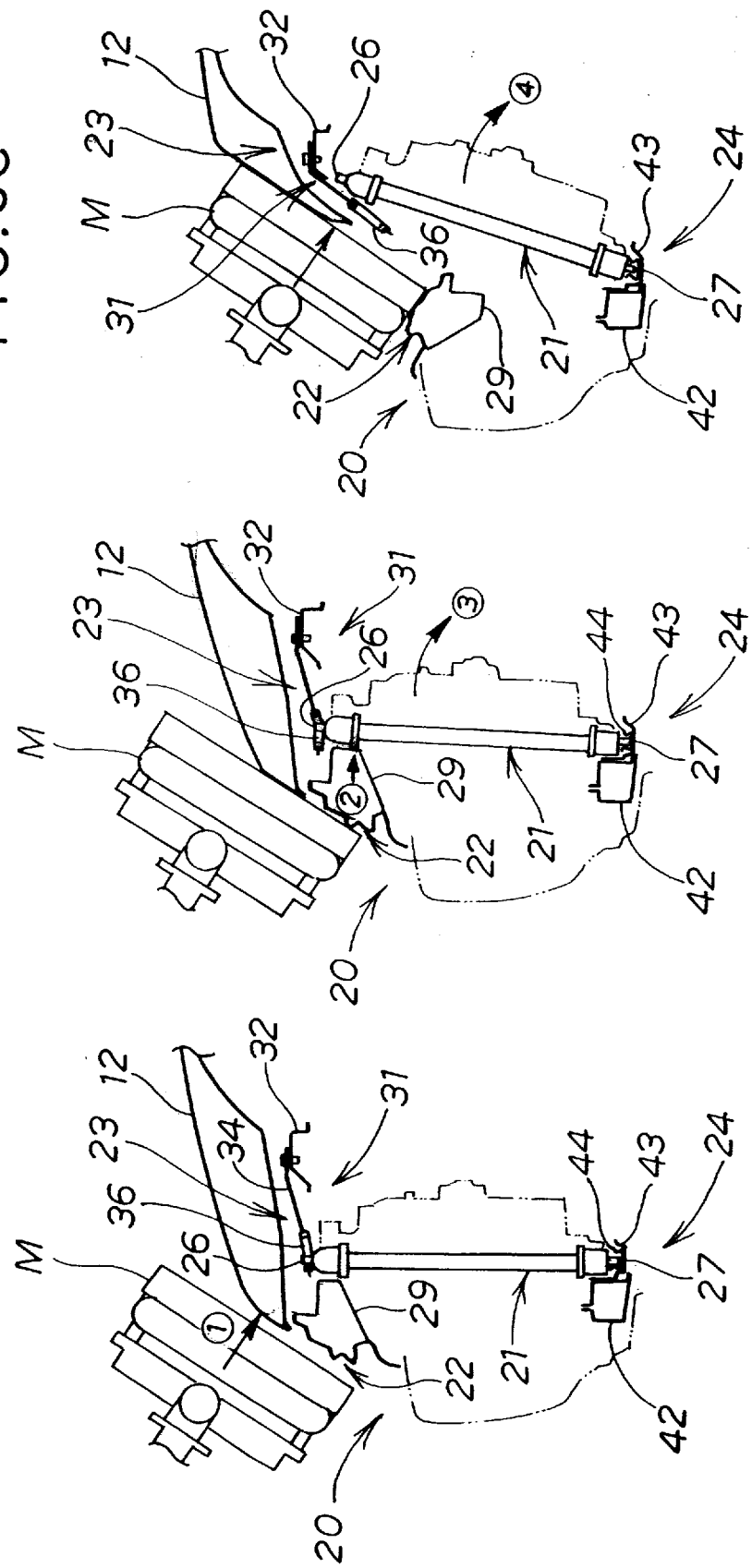

RADIATOR MOUNTING STRUCTURE

BACKGROUND OF THE INVENTION

1. Field of the Invention

This invention relates to radiator mounting structures and, more particularly, to a radiator mounting structure in which a radiator can be moved rearwardly when an external force exceeding a given value is applied to the radiator.

2. Description of the Related Art

Various radiator mounting structures have heretofore been proposed in the art as disclosed, for example, in Japanese Utility Model Laid-Open Publication (Kokai) No. SHO-60-46335 entitled "Radiator Support Structure For Vehicle" and Japanese Utility Model Laid-Open Publication (Kokai) No. SHO-60-47826 entitled "Radiator Support With Gap Adjustment Function".

In the radiator support structure disclosed in Kokai No. SHO-60-46335, the radiator has its bottom portion mounted on a lower cross member by means of brackets and resilient members, while the radiator has, at its upper portion, formed with boss portions fitted into respective, resilient cylindrical shaped members which are mounted to an upper cross member by means of brackets and resilient members.

In the radiator support disclosed in Kokai No. SHO-60-47826, the radiator has its lower portion mounted on a vehicle body by means of lower radiator supports and its upper portion mounted to the vehicle body by means of support metal fittings and an upper radiator support.

Recently, it has been proposed in the prior art to have the vehicle equipped with a damping device such as a hood having its front end formed with plastic, or a hood with its weakened frame stiffness for thereby protecting an obstacle from being applied with an excessive impact due to hood's distortion during collision of the hood against the obstacle to be protected.

However, notwithstanding the provision of such a damping device on the hood, protective distortion of the hood is restricted by the radiator when the latter is mounted under the hood.

Where the hood having the above-noted damping device is combined with the radiator mounting structure of Kokai No. SHO-60-46335, a sufficient gap or distance cannot be provided between the hood and the radiator for thereby fully alleviating the impact force acting on the obstacle. To this end, the vehicle is required to have a large engine room or compartment. This results in drawbacks in that a structural design of the vehicle is restricted and, for example, the vehicle length inevitably increases with a resultant increase in the weight of the vehicle.

Even in a case where the above hood is combined with the radiator support structure of Kokai No. SHO-60-47826, similar drawbacks are encountered, as those in the structure of Kokai No. SHO-60-46335, because of the arrangement in that the radiator is not readily moved rearward due to the hood's distortion or the radiator is not collapsible.

SUMMARY OF THE INVENTION

The present invention has been attained in view of the above-described inadequacies of the related art. It is accordingly an object of the present invention to provide a radiator mounting structure which enables sufficient alleviation of an impact force to be applied to an obstacle without restricting structural designing.

According to an aspect of the present invention, there is provided a radiator mounting structure designed to be connected to a front part of a vehicle body, the front part having an upper and lower cross members, which structure comprises: a radiator having an upper end with an upright pin; a front grill located in front of the radiator and having a projection projecting toward the radiator; a lower supporting structure mounted to the lower cross member for sustaining a lower end of the radiator such that the radiator can make a tilting movement in a rearward direction of the vehicle body; and an upper supporting structure mounted to the upper cross member and having resilient supporting means for resiliently sustaining the upright pin so as to enable the pin to disengage from the resilient means when the radiator is applied via the projection with an impact force larger than a given magnitude.

In this arrangement, when the hood is deformed for some reasons such as, for example, when the hood collides against the obstacle, the front grill is moved rearward to cause the projections thereof to press the radiator. As a result, the radiator is applied with a force greater than the given value in a rearward direction, the upper support pin of the radiator is removed from the resilient support means and, accordingly, the radiator is tilted rearward around a center of the lower support pin. Thus, the impact force applied by the obstacle is effectively absorbed within a limited space and, at the same time, the hood can be deformed to a sufficient extent.

In a preferred form, the resilient support means comprises a bracket fixedly secured to the upper cross member and having a mounting bore, and a resilient support rubber member fitted to the mounting bore and having an engagement bore to fit therein the upper support pin.

BRIEF DESCRIPTION OF THE DRAWINGS

These and other features and advantages of the present invention may be more readily understood from the following detailed description when taken in conjunction with the accompanying drawings, in which:

FIGS. 5A to 5C are partial schematic views illustrating an operation of the radiator mounting structure upon collision of an obstacle with the vehicle body;

DETAILED DESCRIPTION OF THE PREFERRED EMBODIMENTS

The following description is merely exemplary in nature and is in no way intended to limit the invention, it application or uses.

Figure 1:
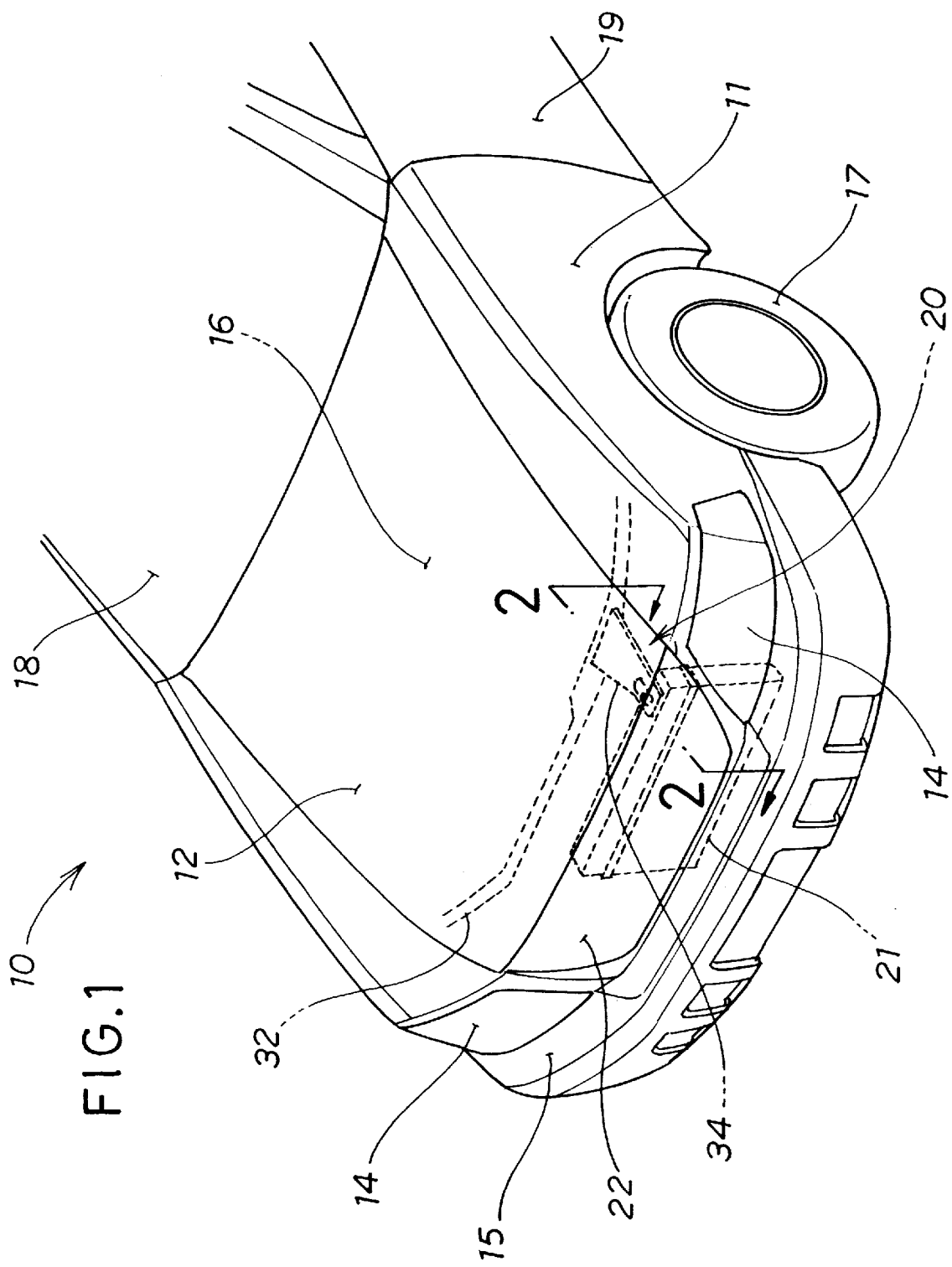
FIG. 1 is a perspective view of a front part of a vehicle body employing a radiator mounting structure according to the present invention.

Referring to FIG. 1, a front body 10 of a vehicle body has front fenders 11, 11 each forming a front portion of both sides of the vehicle body, a hood 12 covering an upper front portion of the vehicle body, a front grill 22 covering a front face of the vehicle body, a pair of head lights 14, 14 fitted to the front face of the vehicle body, and a bumper 15 fitted to lower portions of the head lights 14, 14 and the front grill 22. An engine compartment 16 is formed by the front fenders 11, 11, the hood 12, the front grill 22 and the bumper 15. The front body 10 incorporates therein the radiator mounting structure 20. Reference numerals 17, 18 and 19 are assigned to front wheels (one of the front wheels is not seen), a front glass and front doors (one of the front doors is not seen).

Figure 2:
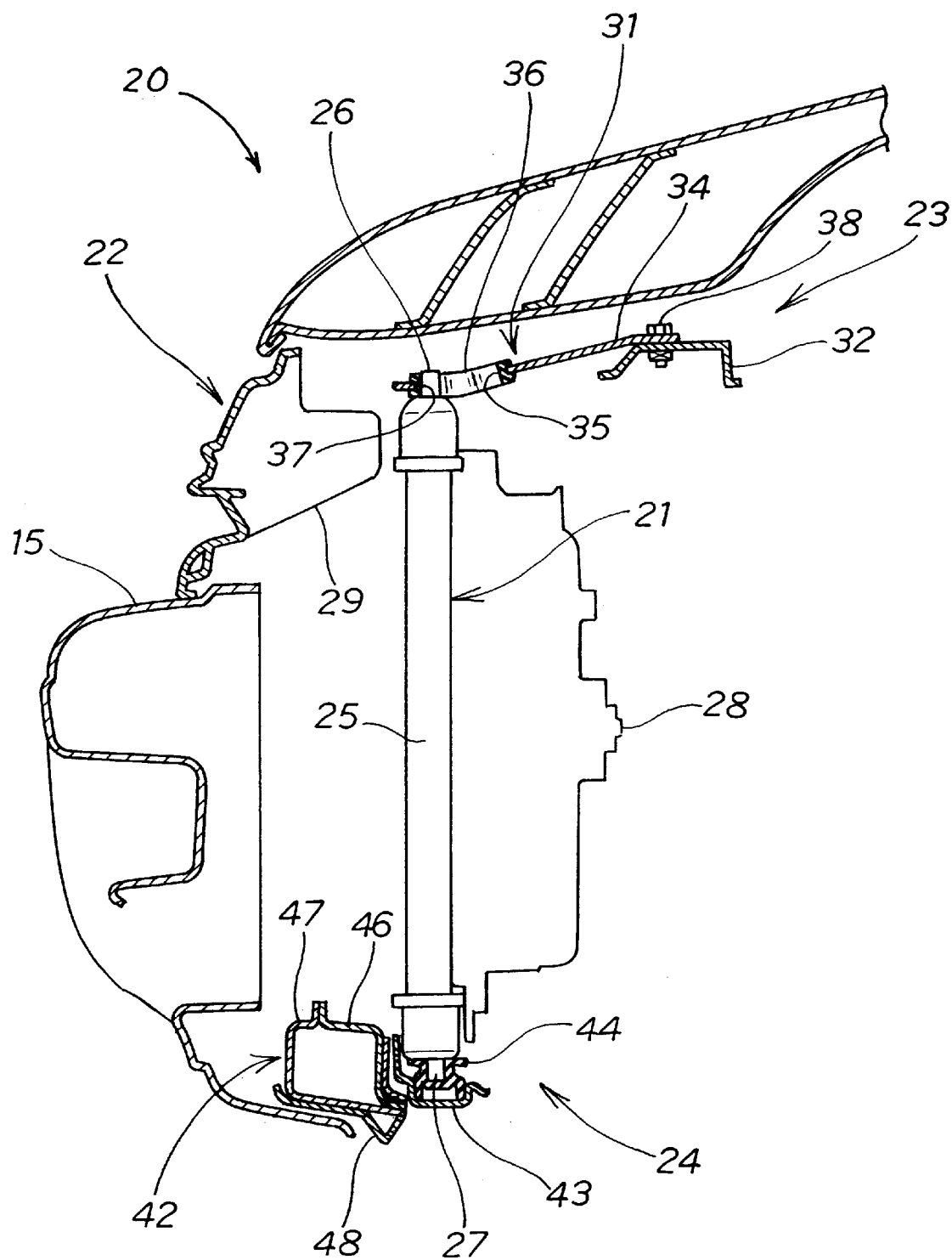
FIG. 2 is an enlarged, cross-sectional view taken along line 2—2 of FIG. 1, illustrating the radiator mounting structure.
Figure 3:
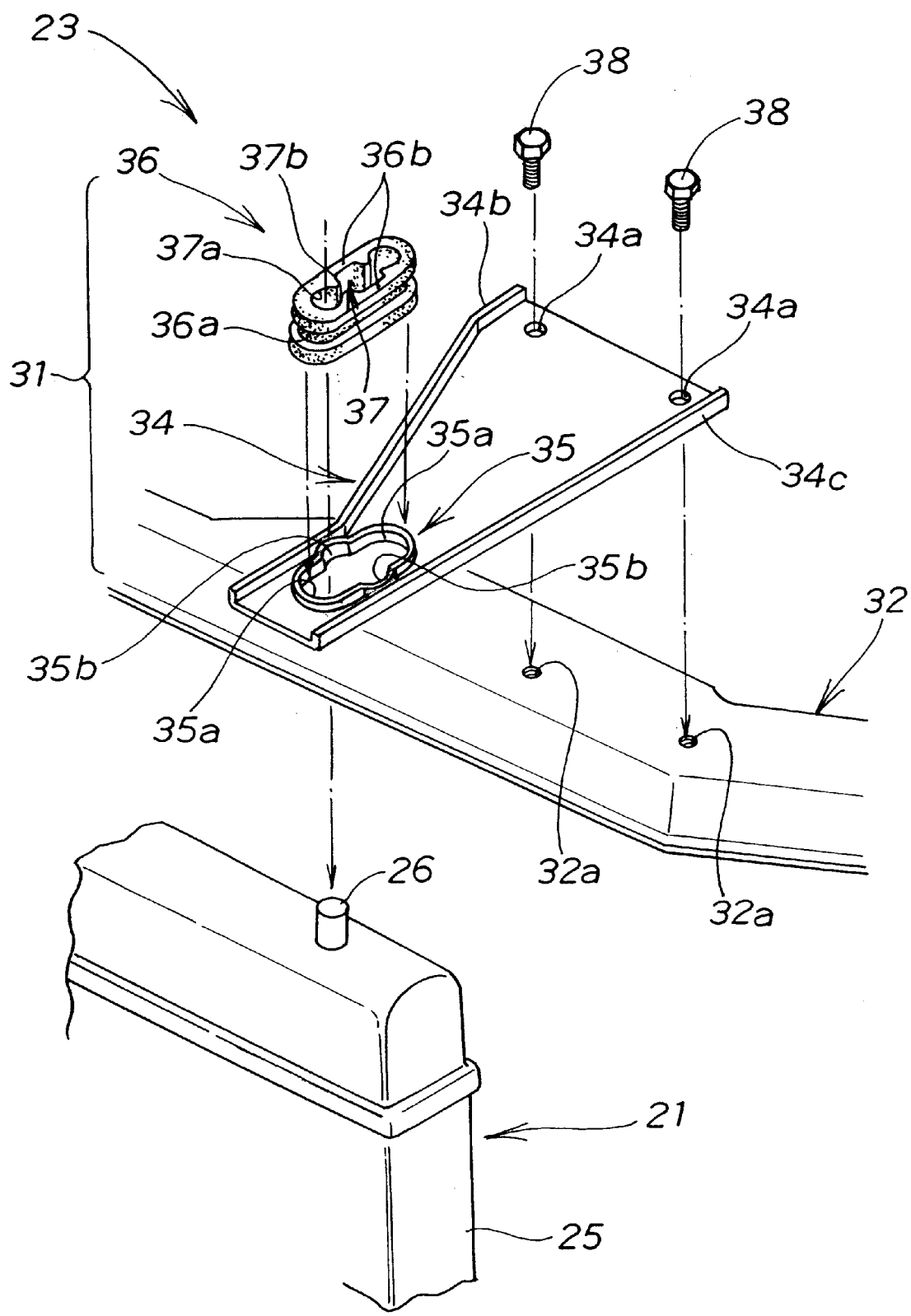
FIG. 3 is an exploded perspective view of an upper support structure forming part of the radiator mounting structure of FIG. 2.

FIGS. 2 and 3 show the radiator mounting structure 20 and an upper support structure associated therewith.

In FIGS. 2 and 3, the radiator mounting structure 20 is comprised of the front grill 22 located in front of the radiator 21, an upper supporting structure 23 which supports an upper portion of the radiator 21 by means of a resilient supporting means 31, and a lower supporting structure 24 which supports a lower portion of the radiator 21.

The radiator 21 has a body 25 having its upper end provided with an upper supporting pin 26. The radiator body 25 has its lower end formed with a lower support pin 27. An electric fan 28 is mounted at a rear side of the radiator 25. The front grill 22 has a projection 29 extending toward the radiator 21.

The radiator 21 has its upper portion fixedly supported by the upper supporting structure 23 by means of the upper supporting pin 26. The radiator 21 has its lower portion fixedly supported by the lower supporting structure 24 by means of the lower supporting pin 27.

The resilient supporting means 31 is comprised of a bracket 34 having its one end fixedly secured to an upper cross member 32. The bracket 34 has its other end formed with a mounting bore 35. As shown in FIG. 3, the mounting bore 35 is fitted with an upper supporting rubber 36. The supporting rubber 36 is formed with an engagement aperture 37, with which the upper supporting pin 26 engages.

Reference numerals 38, 38 are assigned to bolts for fixedly securing the bracket 34 to the upper cross member 32, and the reference numerals 32a, 32a are assigned to threaded portions formed in the upper cross member 32.

The bracket 32 is configured to have a substantially flat shaped member. The bracket 32 has its one end formed with small bores 34a, 34a to admit the bolts 38, 38 therethrough to be fixedly secured to the upper cross member 32 and also has its another end formed with a mounting bore 35 into which the upper supporting rubber 36 is fitted. The bracket 34 has its both sides formed with upright ribs 34b, 34c for reinforcing the bracket 34. The mounting bore 35 is shaped to have an elongated circle configuration formed with mounting portions 35a, 35a which have indent portions 35b, 35b, respectively, to provide ease of deformation of the upper supporting rubber 36 during insertion of the upper supporting pin 26 into the engagement aperture of the upper supporting rubber 36.

The upper supporting rubber 36 has its peripheral wall formed with a recess 36a which is fitted to the mounting portions 35a, 35a of the mounting bore 35. The engagement aperture 37 of the upper supporting rubber 36 is formed by a fitting portion 37a into which the upper supporting pin 26 of the radiator 21, and an opening portion 37b directed toward a rear portion of the vehicle for providing ease of disengagement of the upper supporting pin 26 of the radiator 21 from the fitting portion 37a. Reference numerals 36b, 36b are assigned to middle portions of the upper supporting rubber 36.

Figure 4:
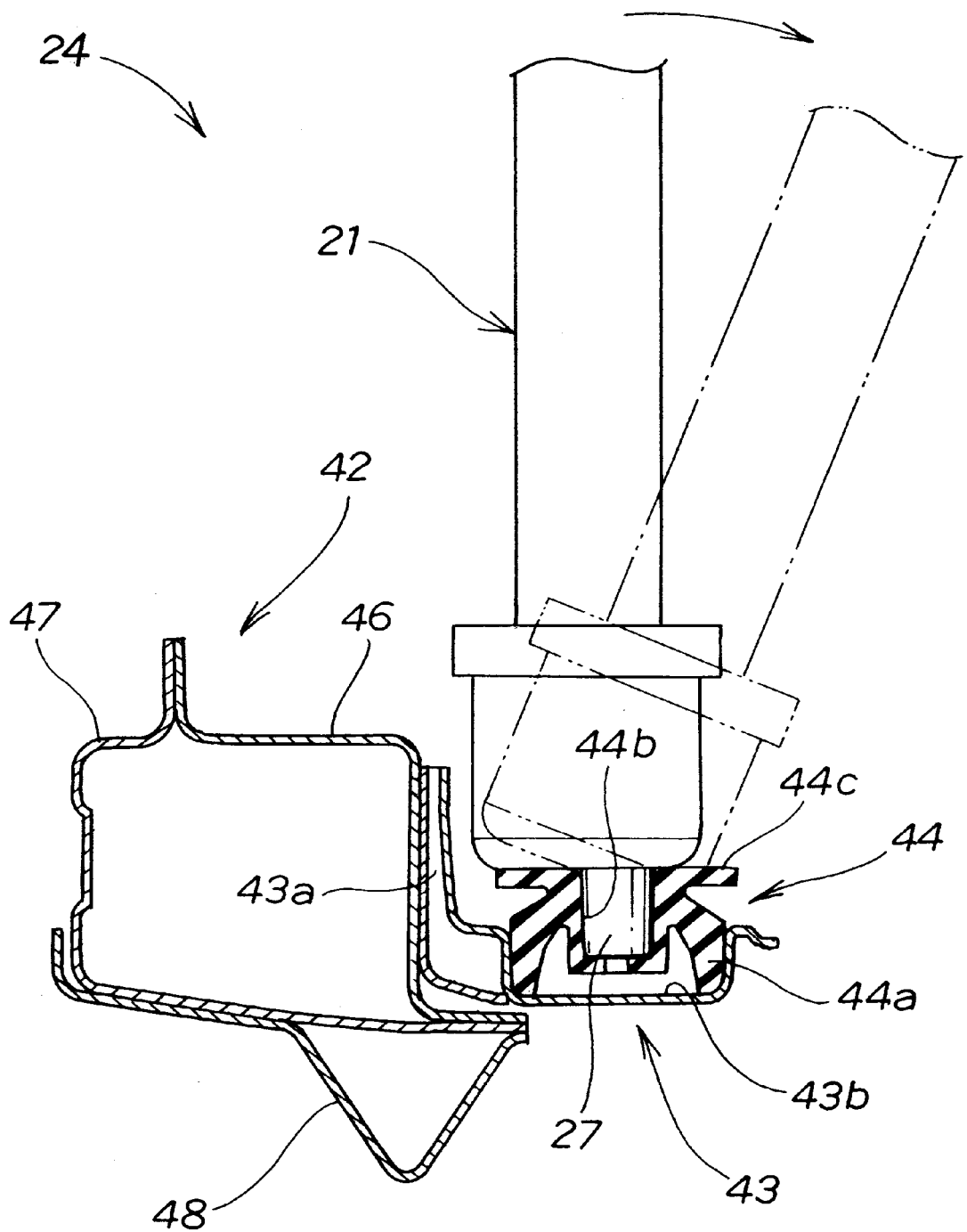
FIG. 4 is an enlarged cross-sectional view of a lower support structure forming part of the radiator mounting structure of FIG. 2.

FIG. 4 shows a detailed structure of the lower supporting structure 24.

The lower supporting structure 24 has a supporting stay 43 fixedly secured to the lower cross member 42, and a lower supporting rubber 44 fixed to the supporting stay 43 for resiliently sustaining the lower supporting pin 27 of the radiator 21. The lower supporting rubber 44 is resiliently deformable. For this reason, the radiator 21 is thus supported in a manner to tilt rearward around a center of the lower supporting pin 27 as shown by a phantom line in FIG. 4.

The lower supporting member 42 is located in front of the radiator 21 and comprised of an upper frame 46 and a lower frame 47, to which a reinforcement member 48 is attached.

The lower supporting stay 43 has a mounting portion 43a by which the lower supporting stay 43 is mounted to the lower cross member 42, and a support portion 43b for sustaining the lower supporting rubber 44.

As already noted, the lower supporting rubber 44 is made of a resiliently deformable rubber, which has a pair of foot portions 44a sustained by the lower supporting stay 43, and a recessed portion 44b with which the lower supporting pin 27 of the radiator 21 engages, and a supporting surface 44c for sustaining the lower end of the radiator 21.

Now, the operation of the radiator mounting structure 20 discussed above will be described below with reference to FIGS. 5A to 6C.

In FIG. 5A, the obstacle M comes from an upper and front area of the vehicle body, thereby colliding against the vehicle body in a direction as indicated by an arrow ①.

In FIG. 5B, the obstacle M collapses the hood 12 while pressing the front grill 22 toward the rear portion of the vehicle body whereby the projection 29 of the front grill 22 pushes the upper portion of the radiator 21 rearward in a direction as shown by an arrow ②. In this instance, the radiator 21 begins to tilt toward the rear portion of the vehicle body around the center of the lower supporting pin 27 of the radiator 21 in a direction as shown by an arrow ③.

In FIG. 5C, the projection 29 of the front grill 22 further presses the upper portion of the radiator 21 and, so, the upper supporting pin 26 is disengaged from the resilient supporting means 31 so that the radiator 21 is further tilted rearward in a direction as shown by an arrow ④.

During the above tilting step, since the upper cross member 32 is located at the rear portion of the radiator 21 so as to keep the stroke of the radiator 21 during its tilting movement, the radiator 21 is enabled to tilt rearward without colliding against the upper cross member 32.

Namely, the radiator mounting structure 20 functions in such a manner that, for example, when the obstacle M collides against the hood 12, the hood 22 is deformed while, at the same time, the front grill 22 is pressed rearward to cause the projection 29 to push the radiator 21 in the same direction whereby, when the radiator 21 is applied with an external force greater than the given value in the rearward portion of the vehicle body, the upper supporting pin 26 of the radiator 21 is disengaged from the resilient supporting means 31, thereby enabling the rearward tilting motion of the radiator 21 around the center of the lower supporting pin 27. As a result, when the obstacle M collides against the hood 12, the hood 12 is enabled to deform in a given space while absorbing the impact applied by the obstacle M for thereby alleviating the shock to be applied to the obstacle M.

For this reason, no restriction is required in the structural design of the vehicle body and, also the vehicle body is not required to have an increased length or weight. Accordingly, it is possible to realize the radiator mounting structure 20 which enables to sufficiently alleviate the mechanical impact, within the given space, to be applied to the obstacle M.

Figure 6A:
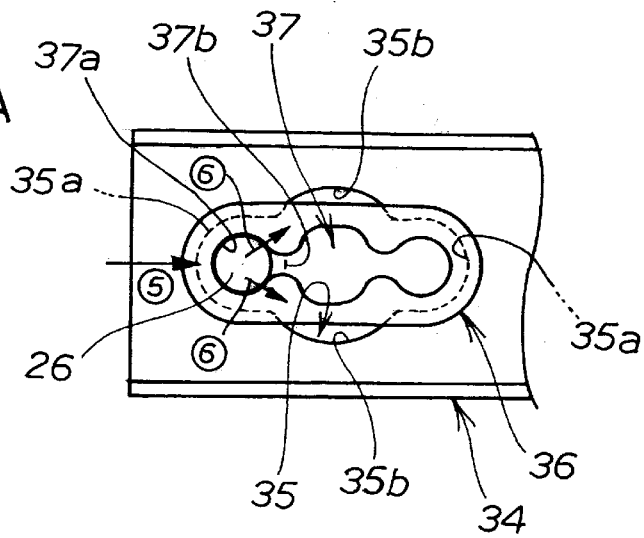
FIGS. 6A to 6C are schematic plan views showing an operational relationship between a support rubber and an upper support pin of the radiator mounting structure upon collision of the obstacle with the vehicle body.
Figure 6B:
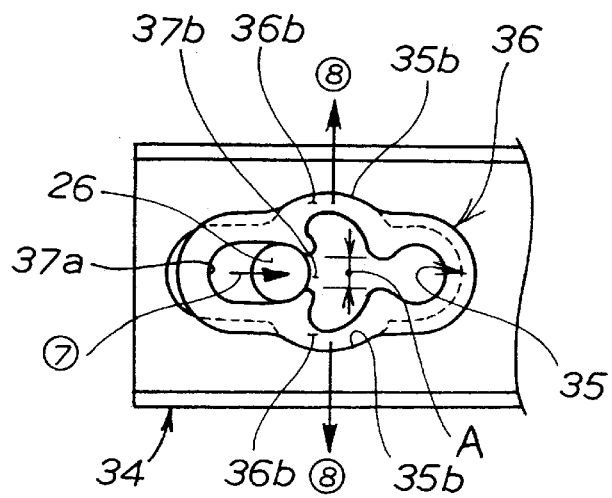
Figure 6C:
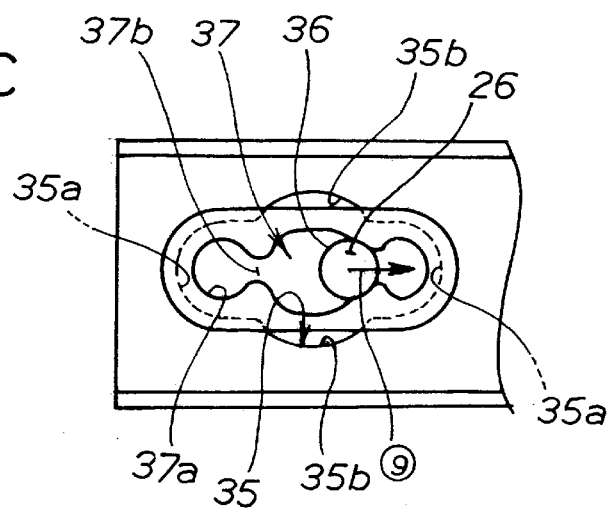

FIGS. 6A to 6C show a deforming condition of the resilient supporting rubber 36.

In FIG. 6A, if an external force is applied to the upper supporting pin 26 in the rearward direction of the vehicle body as shown by an arrow ⑤, the engagement aperture 37 of the resilient supporting rubber 36 is subjected to forces in directions as shown by arrows ⑥ so as to open the opening 37b.

In FIG. 6B, when the upper supporting pin 26 moves in the rearward direction of the vehicle body in a direction as shown by an arrow ⑦, since the mounting bore 35 of the bracket 34 has the indents 35b, 35b, the middle portions 36b of the resilient supporting rubber 36 are deformed in directions as shown by arrows ⑧, ⑧. If the middle portions 36b, 36b are deformed in the above fashion, an opening width A of the opening 37b increases and, therefore, the upper supporting pin 26 readily disengages from the fitting portion 37a.

In FIG. 6C, the upper supporting pin 26 further moves in the rearward direction of the vehicle body as shown by an arrow ⑨ and, consequently, the upper supporting pin 26 disengages from the resilient supporting means 31 (see FIG. 2). Namely, since the mounting bore 35 is formed by the mounting portions 35a, 35a for sustaining the supporting rubber 36, and the indents 35b, 35b to admit the supporting rubber 36 to widen sideward, the supporting rubber 36 is enabled to be readily deformed. Further since the engagement bore 37 is formed by the fitting portion 37b to which the upper supporting pin 26 is fitted, and the opening portion 37b contiguous with the fitting portion 37a and opening in the rearward direction of the vehicle body, the supporting rubber 36 easily enables to disengage the upper supporting pin 26 of the radiator 21 therefrom (see FIG. 2).

Figure 7A:
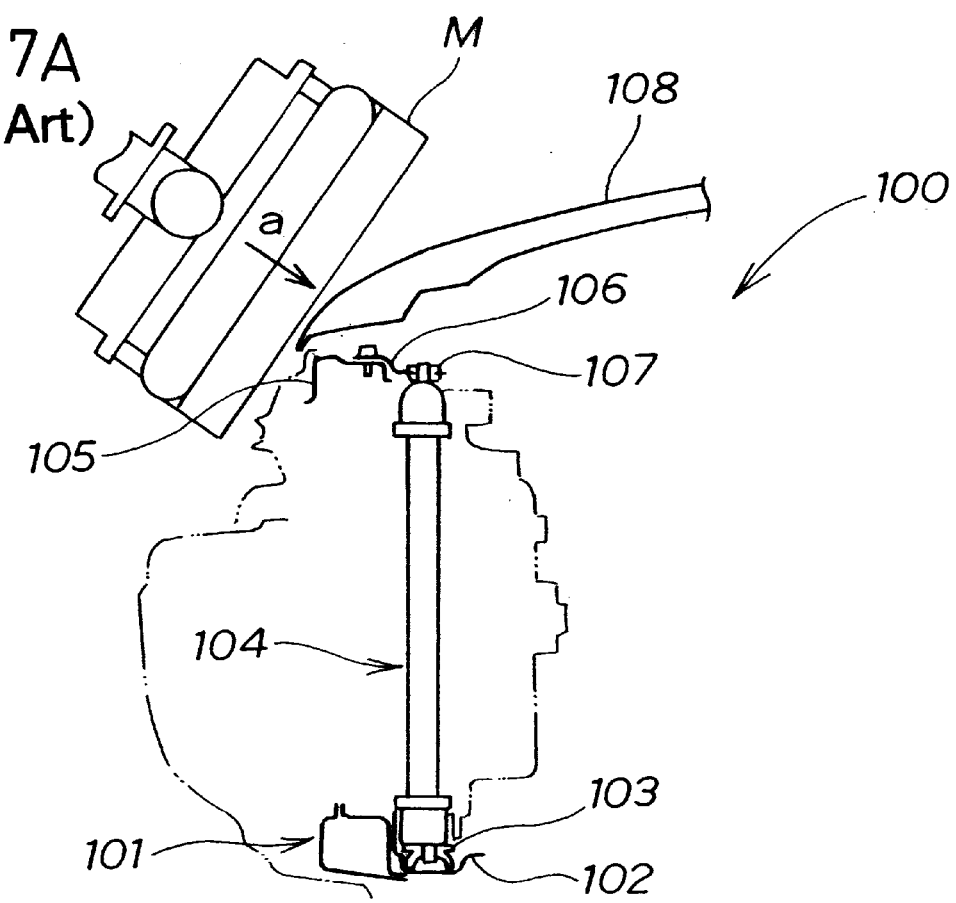
FIGS. 7A and 7B are schematic views illustrating an operation of a known radiator mounting structure as compared with the inventive arrangement.
Figure 7B:
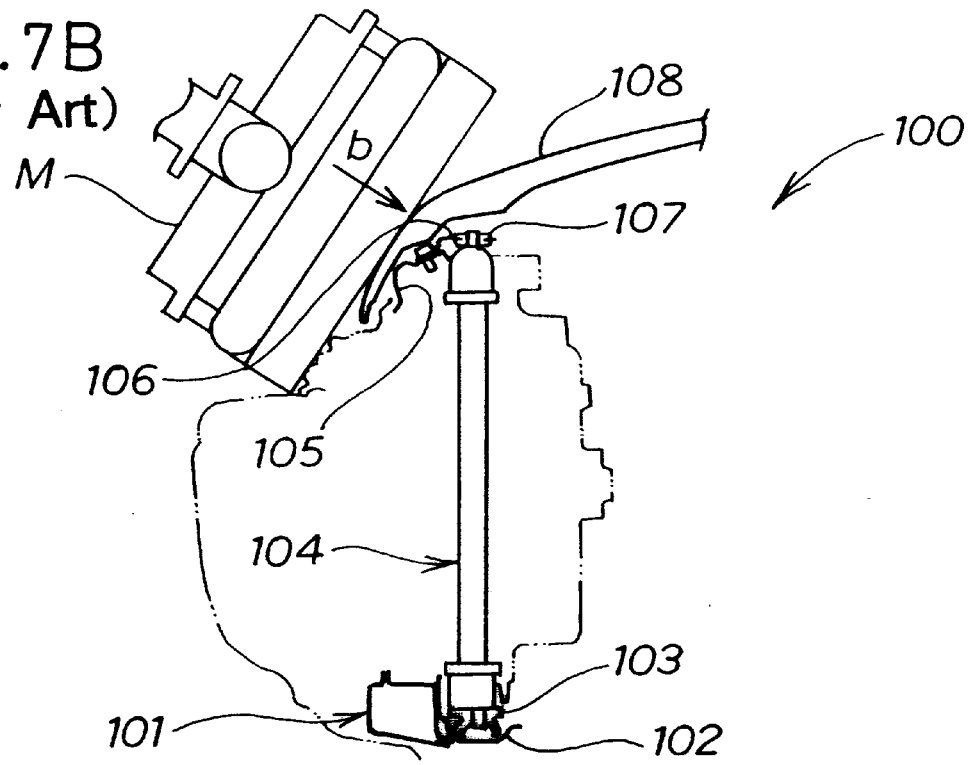

A known radiator mounting structure is exemplified in FIGS. 7A and 7B for comparison in terms of operation with the above-described radiator mounting structure.

As shown in FIG. 7A, the known radiator mounting structure 100 has a structure in which a lower portion of a radiator 104 is supported by a lower cross member 101 by means of a supporting stay 102 secured to the lower cross member 101 and a lower supporting rubber 103 which sustains the lower end of the radiator 104 whereas an upper end of the radiator 104 is fixedly supported by an 20 upper cross member 105 located in front of the radiator 104 by means of a bracket 106 and an upper supporting rubber 107. The obstacle M collides against a hood 108 from a front side of the vehicle body as shown by an arrow a.

In FIG. 7B, the obstacle M collapses the hood 108 as shown by arrow b. In this instance, the hood 108 is caused to collide against the upper cross member 105 and brought into contact with the radiator 104. Thus, the obstacle M is applied with a large impact force. If, however, the upper cross member 105 is located at a rear side of the radiator 104 and the obstacle M is directly brought into contact with the radiator 104 without contacting the upper cross member 105, since the upper portion of the radiator 104 can not tilt around the center of the lower end of the radiator 104, the impact force acting on the obstacle M becomes large in magnitude.

Although, in the preferred embodiment of the present invention, the radiator 21 has been shown and described as having its upper end formed with a single upright supporting pin 26 which is supported by the single resilient supporting means 31, the principle concept of the present invention is not limited to the above discussed embodiment and it may be modified such that the upper end of the radiator is formed with a plurality of pins which are sustained by a plurality of resilient supporting means, respectively.

It will now be appreciated from the foregoing description that, in the above discussed embodiment, the front grill located in front of the radiator is formed with the projections extending toward the radiator and, if the hood is deformed due to some reasons such as collision against the obstacle, the front grill is forced rearward to thereby cause the projection to press the radiator. As a result, the hood can be sufficiently deformed while absorbing the impact force of the obstacle within the limited space and, accordingly, the impact force to be applied to the obstacle can be effectively alleviated without causing any restriction in the structural design of the vehicle body and without increasing the length and weight of the vehicle. Namely, it is possible to provide a radiator mounting structure which enables to sufficiently alleviate the impact force to be applied to the obstacle within the limited space.

Obviously, various minor changes and modifications of the present invention are possible in the light of the above teaching. It is therefore to be understood that within the scope of the appended claims the invention may be practiced otherwise than as specifically described.

What is claimed is:

1. A radiator mounting structure of a radiator body having upper and lower cross members, said structure comprising:

said radiator body having an upper end with an upright pin;

a front grill located in front of said radiator body and having a projection projecting toward said radiator body;

a lower supporting structure mounted to the lower cross member for sustaining a lower end of said radiator body such that said radiator body can make a tilting movement in a rearward direction away from said front grill; and an upper supporting structure mounted to the upper cross member and having resilient supporting means having an elongated engagement aperture for resiliently sustaining said upright pin, wherein said elongated engagement aperture has an opening directed toward a rear portion of the vehicle such that said pin disengages from said resilient means when said radiator body is applied via said projection with an impact force larger than a given magnitude.

2. A radiator mounting structure according to claim 1, wherein said resilient supporting means comprises a bracket fixedly secured to the upper cross member and having a mounting bore, and a supporting rubber fitted to said mounting bore and having an engagement aperture for sustaining said pin therein.

* * * * *